United States Patent
Nambiar et al.

(10) Patent No.: US 10,642,803 B2
(45) Date of Patent: May 5, 2020

(54) ADDING A PARTITION TO AN EXISTING TABLE STORED ON A DISTRIBUTED FILE SYSTEM

(71) Applicant: salesforce.com, inc., San Francisco, CA (US)

(72) Inventors: Gopi Krishnan Nambiar, San Mateo, CA (US); Siddhi Mehta, Fremont, CA (US); Aakash Pradeep, Fremont, CA (US); Shangkar Meitei Mayanglambam, Santa Clara, CA (US)

(73) Assignee: salesforce.com, inc., San Francisco, CA (US)

( * ) Notice: Subject to any disclaimer, the term of this patent is extended or adjusted under 35 U.S.C. 154(b) by 317 days.

(21) Appl. No.: 15/885,489

(22) Filed: Jan. 31, 2018

(65) Prior Publication Data

US 2019/0236169 A1 Aug. 1, 2019

(51) Int. Cl.
| | |
|---|---|
| *G06F 16/21* | (2019.01) |
| *G06F 16/27* | (2019.01) |
| *G06F 16/182* | (2019.01) |
| *G06F 16/22* | (2019.01) |
| *G06F 16/242* | (2019.01) |

(52) U.S. Cl.
CPC .......... *G06F 16/211* (2019.01); *G06F 16/182* (2019.01); *G06F 16/221* (2019.01); *G06F 16/2445* (2019.01); *G06F 16/27* (2019.01)

(58) Field of Classification Search
CPC ....... G06F 16/211; G06F 16/27; G06F 16/182
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

U.S. Appl. No. 13/986,251, filed Apr. 16, 2013.

*Primary Examiner* — Loc Tran
(74) *Attorney, Agent, or Firm* — Dergosits & Noah LLP; Todd A. Noah (57) ABSTRACT

Systems and methods are described for registering a new column in an existing table on a distributed file system as a partition. In response to receiving a request to add a new column to a selected table, a new table may be created that includes all fields of the selected table, the new column, and a new partition, and the selected table may be renamed within the distributed file system. A view may then be created that points to data in the new table and the renamed selected table, the created view being a virtual table that receives and processes queries. All data from the renamed selected table may be transferred the new table. When the transfer is complete, the new table may be renamed to an original name of the selected table, and any data received after the renaming may be included in the renamed new table.

20 Claims, 8 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2018/0129676 A1* | 5/2018 | Eberlein .................. G06F 8/71 |
| 2019/0065536 A1* | 2/2019 | Becker .................. G06F 16/219 |

\* cited by examiner

ADDING A PARTITION TO AN EXISTING TABLE STORED ON A DISTRIBUTED FILE SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to managing tables stored on a distributed file system, and more specifically to adding a column to an existing table that may also be queried as a separate data partition.

SUMMARY OF THE INVENTION

Systems and methods are described for registering a new column in an existing table on a distributed file system as a partition. A database system may receive a selection of a table having an associated name stored within a distributed file system, and receive a request to add a new column to the selected table. The request may also include a request for a new data partition of the table, where the new partition includes data from the new column. In response to receiving the request, a new table may be created that includes all fields of the selected table, the new column, and the new partition. Also in response to receiving the request, the selected table may be renamed within the distributed file system, where the renaming is performed by changing a pointer of the distributed file system to refer to the renamed selected table. The renaming may be performed using an atomic operation, which advantageously allows the renaming to be performed without requiring any down time for the database system. A view may then be created that points to data in each of the new table and the renamed selected table, the created view being a virtual table created on the distributed file system.

The database system may then cause any new data sent for the selected table to be included in the new table and cause all data from the renamed selected table to be transferred the new table by adding pointers to the data to the new table. While the transferring all data is being performed, the database system may route received queries to the renamed selected table when data in the selected table is being queried and route the received queries to the new table when new data being queried. In response to the transferring all data being completed, the new table may be renamed to the original associated name of the selected table by changing the pointer of the distributed file system to refer to the renamed new table. The database system may then cause any data received after the renaming the new table to be included in the renamed new table, where subsequent queries of the selected table are directed to the renamed new table. Using the described method advantageously creates the new partition on the column of data without requiring the database system to be taken offline, as the created view allows for queries to be processed on both existing data and new data in the selected table. Additionally, the changes made to the selected table may also be transparent to any users of the database system, who do not need to alter commands or queries made to the selected table both during the process of adding the partition or after the process is complete.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Figure 1:
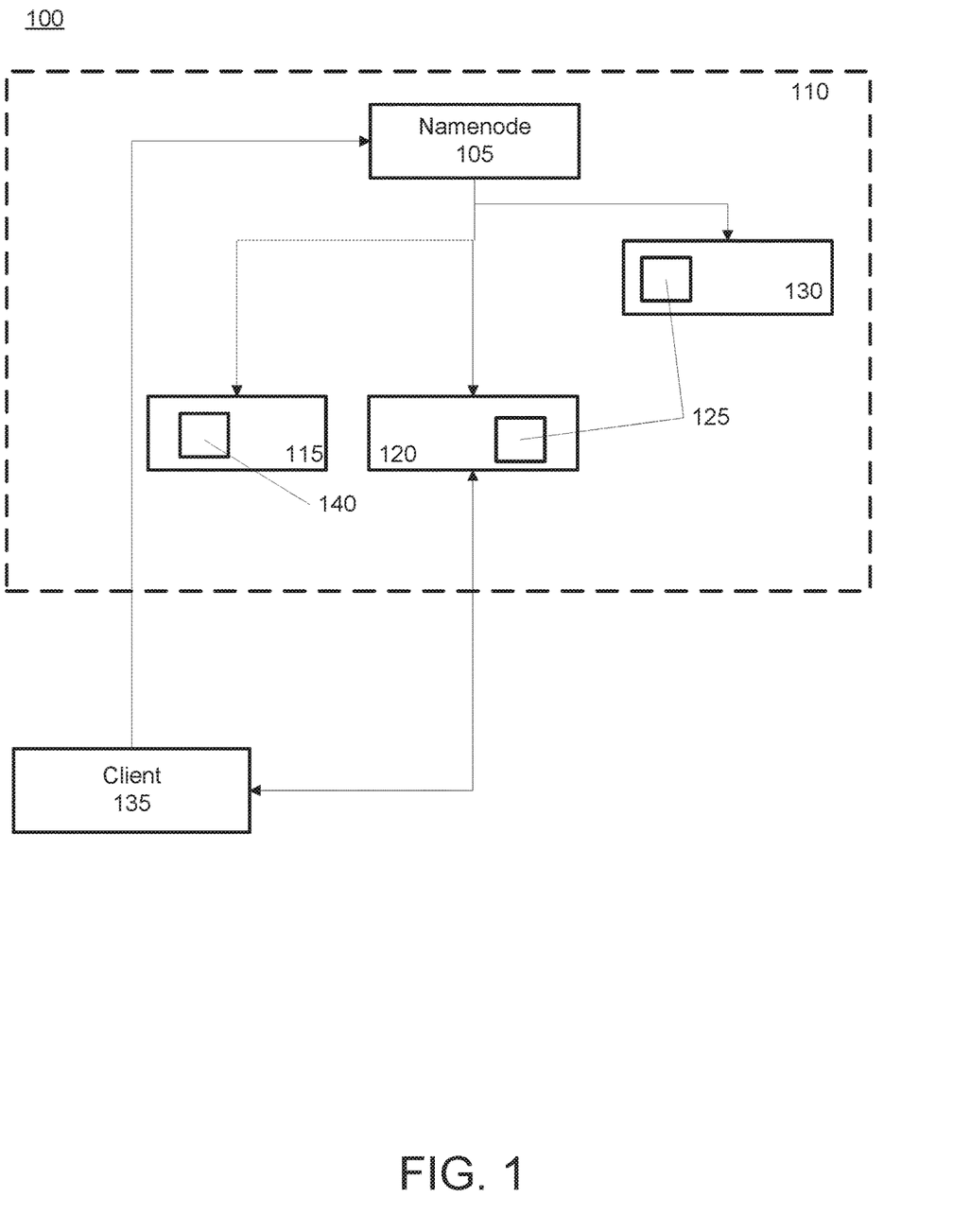
FIG. 1 shows a system diagram for an exemplary distributed file system that includes a table stored on a plurality of nodes.

Distributed data storage systems, such as Apache Hadoop HDFS and HIVE, developed by Apache Software Foundation, of Forest Hill, Md., may be used to store large data sets, including database tables, across a plurality of nodes in a computer cluster. FIG. 1 shows a system diagram for an exemplary system 100 that includes a table stored on a plurality of nodes. Exemplary system 100 may include distributed file system 110 and client computing device 135. The exemplary distributed file system 110 may be a computer cluster that includes Namenode 105 and data nodes 115, 120, and 130. Namenode 105 may be a master server that manages the distributed file system and controls user access to tables stored on the data nodes 115, 120, and 130. The data nodes 115, 120, and 130 may manage memory attached to each node (not shown). Each table, which may include large data sets, may be split into a plurality of blocks (such as blocks 125) stored on the data nodes. Blocks may include different data from a table (such as blocks 140 and 125, which are different data from a table stored on different nodes 115 and 120 of the distributed file system 110), or, as is shown in system 100, may be duplicate blocks of data 125 stored on different nodes 120 and 130. The Namenode 105 may execute operations that run on a namespace of the distributed file system 110 (such as opening, closing, and renaming files and directories on the data nodes) requested by client computing device 135, may store all metadata for the distributed file system 110, and may also configure a mapping of data blocks to the data nodes. Read and write operations to blocks of a table may be managed by individual data nodes 115, 120, and 130, in communication with client computing device 135.

Figure 2:
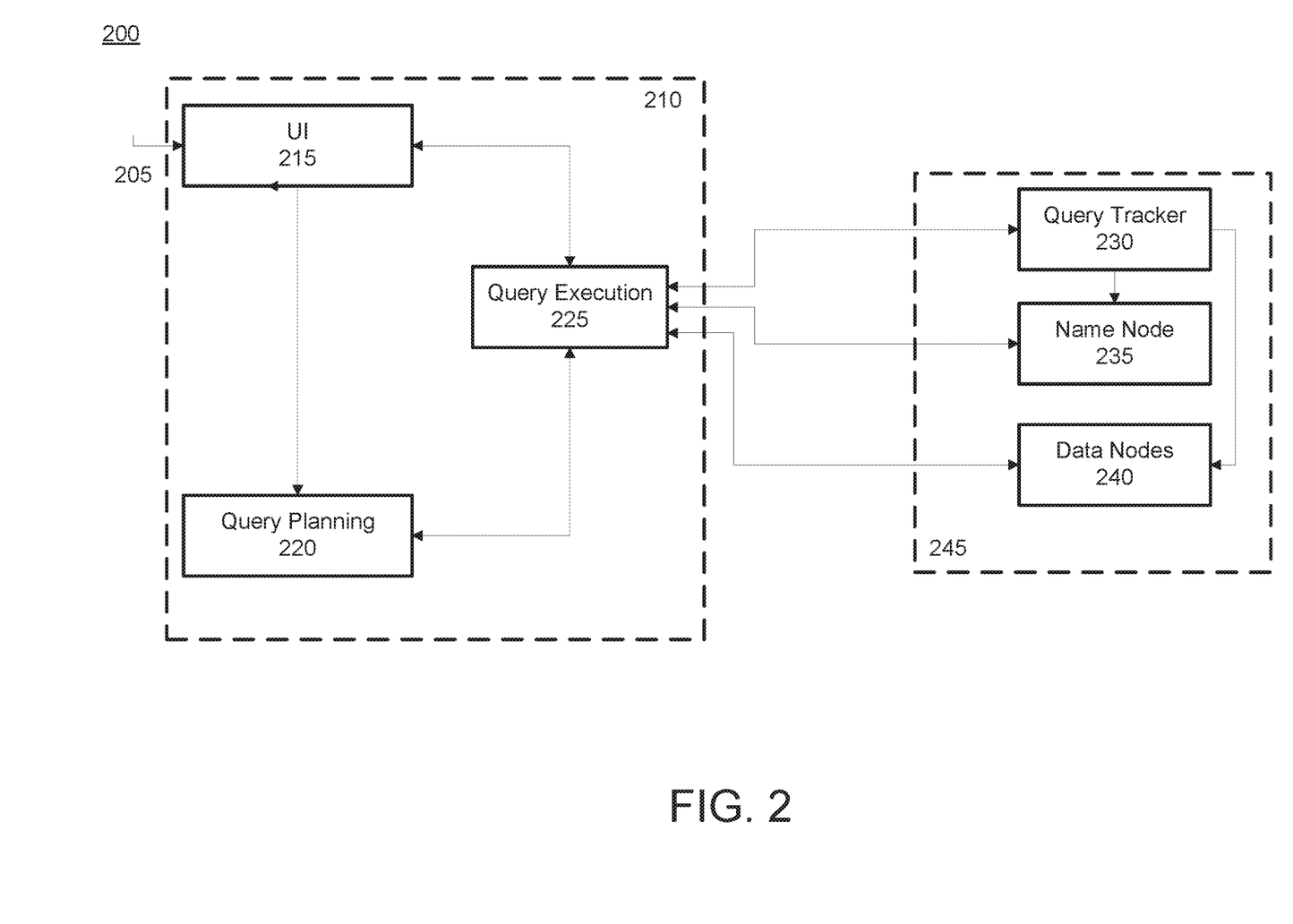
FIG. 2 shows a system diagram for an exemplary database system that processes queries for data on an exemplary distributed file system, in accordance with an embodiment.

A database system that uses a distributed file system (such as distributed file system 110) to organize and store data may utilize a separate system used to read, write and manage datasets stored on the distributed file system. Such a management system, such as Apache Hive (also developed by Apache Software Foundation, of Forest Hill, Md.) may be used to query large datasets, but there may be instances when the users need to filter data of a table on specific column of the table. FIG. 2 shows a system diagram 200 for an exemplary management system 210 that processes queries for data on an exemplary distributed file system 245, in accordance with an embodiment. The exemplary management system 210, which may be implemented on any suitable computing device, may include UI module 215, configured to receive user queries and other user-initiated commands, and forward the user commands to other modules for processing. The UI module 215 may, in some embodiments, include a driver, which may implement session handles and provide execute and fetch application programming interfaces. Query planning module 220, also included within the management system 210 may parse a received query to develop an execution plan further based on metadata regarding files stored on the distributed file system 245. The metadata may be stored locally on the management system 210 and/or may be retrieved from the distributed file system 245 separately. In some embodiments, the query planning module 220 may include a compiler and a metastore as sub-modules. Furthermore, query execution engine 225 may execute the execution plan created by the query planning module 220, by interacting with various components of the distributed file system 245 as shown in FIG. 2.

The distributed file system 245 may include Namenode 235 and data nodes 240, which may operate as described in FIG. 1. The distributed file system 245 may also include query tracker 230, which may include a job tracker and task trackers to perform mapping and reducing functions used for query flows, in conjunction with the Namenode 235 and data nodes 240.

If a user knows the nature of data they deal with, they can identify the columns that are most frequently queried to optimize the performance of queries and create subdivisions of the table data known as partitions. A partition may be a subset of the data in the table that is separately stored on the distributed file system. Partitioning scheme enables database users to have fine granular control over smaller subsets of data for efficient management. If tables are not partitioned, then there will be no means to hint the management system to perform data manipulation specific to a data subset. Further, the database management system may have to scan through numerous database records exhaustively [files in the table's data directory], which may be slow and computationally expensive to perform. This concept is very similar to partitioning in relational databases and can be thought of like horizontal slices of data which allow larger sets of data to be separated into manageable chunks.

Creating new partitions in distributed file systems such as Hadoop and the exemplary database system shown in FIG. 2 may not be possible after the table has already been created. After a table has been created and stored, the database system would need to rewrite the complete dataset in a new location with new partitions added, since each of these partitions are mapped to folders in the distributed file system show in FIGS. 1 and 2. For instance, if there is a table stored that has 1 million rows and separate columns for year and month, the table may map to an exemplary distributed file system as follows:

hdfs://path/to/location/year=<yyyy>/month=<mm>

If a user wanted to add a day column (and partition) to the stored table, a query would need to go through all of the above partitions (and 1 million rows of data) to figure out which date a particular data point falls on and then add a new partition having the following syntax:

hdfs://path/to/location/year=<yyyy>/month=<mm>/ date=<dd>.

As is seen above, a very complicated procedure may be needed to create the new partition and capture how it is related to other partitions.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. Aspects of the one or more embodiments described herein may be implemented on one or more computers or processor-based devices executing software instructions. The computers may be networked in a peer-to-peer or other distributed computer network arrangement (e.g., client-server).

Figure 3:
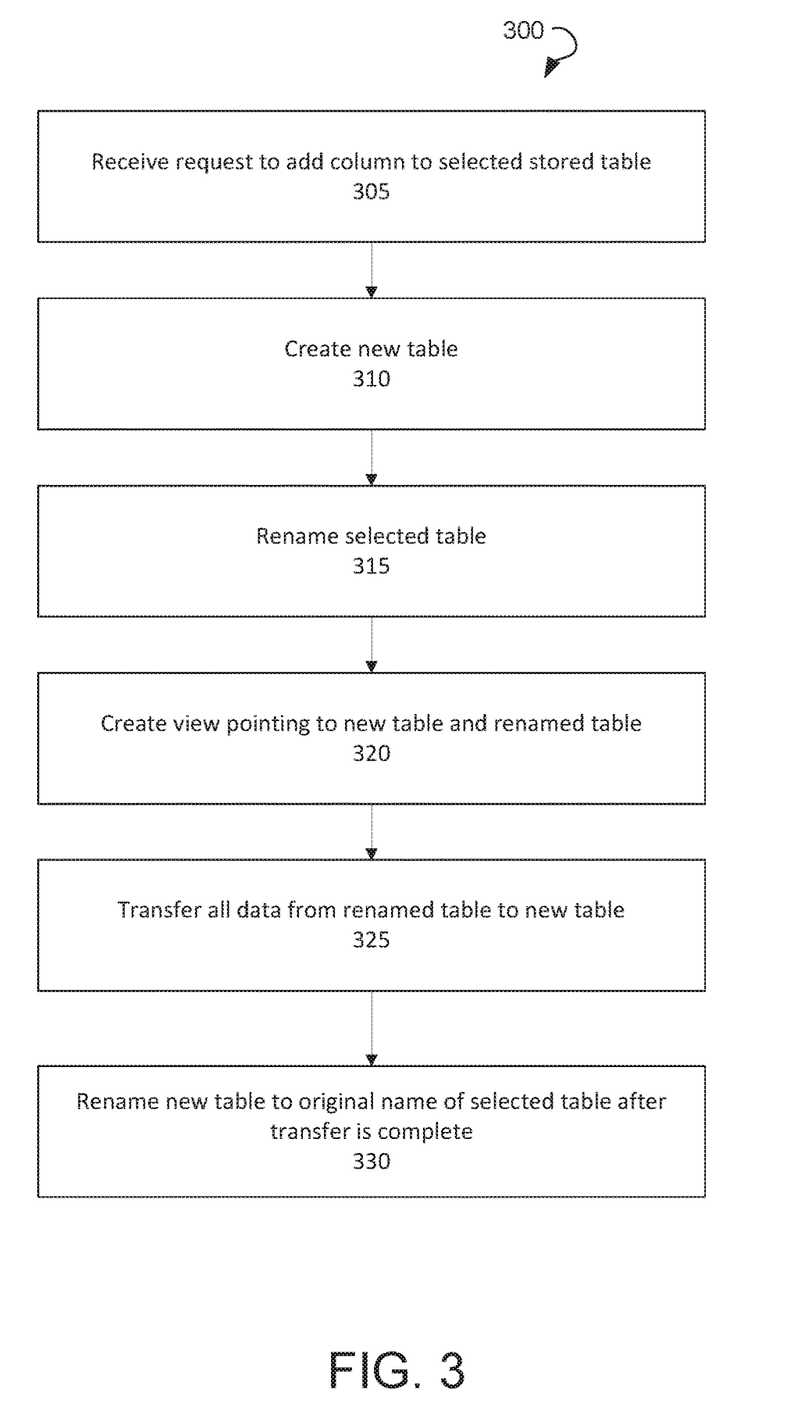
FIG. 3 shows a flow diagram of an exemplary method for registering a new column in an existing table as a partition, in accordance with various embodiments of the present disclosure.

FIG. 3 shows a flow diagram of an exemplary method 300 for registering a new column in an existing table of a distributed file system as a partition, in accordance with various embodiments of the present invention. A database system (such as the system 210 of FIG. 2) may receive a selection of a table having an associated name (also referred to as "the first table" herein), the selected table being stored within a distributed file system, and receive a request to add a new column to the selected table at step 305. The request may also include a request for a new data partition of the table, where the new partition includes data from the new column. In response to receiving the request, a new table (also referred to as the "second table" herein) may be created that includes all fields of the selected table, the new column, and the new partition at step 310. For a first table having a name "log_store," for example, the new/second table may be named "log_store_new," and the new partition may be named "gen_date." While examples discussed herein refer to only one new column (and one corresponding partition), multiple new columns may be added, where each new column has a corresponding partition, in various embodiments.

Also in response to receiving the request, the selected table may be renamed within the distributed file system at step 315. For example, the table "log_store" may be renamed "log_store_old." The renaming may include changing a pointer of the distributed file system to refer to the renamed selected table. The new pointer may point to a location based on the renamed selected table name, such as, for example "/path/to/log_store/location/database_name.db/log_store_old." The renaming may be performed using an atomic operation (i.e., an all-or-nothing operation that may not be interrupted and appears to the database system to occur at once), which advantageously allows the renaming to be performed without requiring any down time for the database system. In an exemplary embodiment, the renaming may be executed using a "alter table . . . rename" command. The addition of the new pointer before executing "alter table . . . rename" command ensures that there is no data movement or data copy which in turn saves network bandwidth and disk space. The renaming may be performed by the database system, or may be caused by the database system to be performed using other system components/modules.

A view may then be created that points to data in each of the new table and the renamed selected table at step 320, the created view being a virtual table created on the distributed database system. In some embodiments, the view may be created using a "union all" command to the database system. Also, in some embodiments, write client applications that are used to write to the selected table may be changed to point to the new table, instead of the old selected table. This step may be done because in various embodiments, users may not be able to write to a view, and the client applications are changed so that no new data is lost during the execution of method 300. For example, file format commands of the client applications, such as ORC scripts, may be changed as part of creating the view, to point to the new table (instead of the selected table). The changes to write client applications may be performed by the database system, or may be caused by the database system to be performed using other system components/modules.

The database system may then cause all data from the renamed selected table to be transferred the new table by adding, to the new table, pointers to the data at step 325. While the transferring all data is being performed, the database system may route received queries to the renamed selected table when data in the selected table is being queried and route the received queries to the new table when new data being queried.

Figure 4:
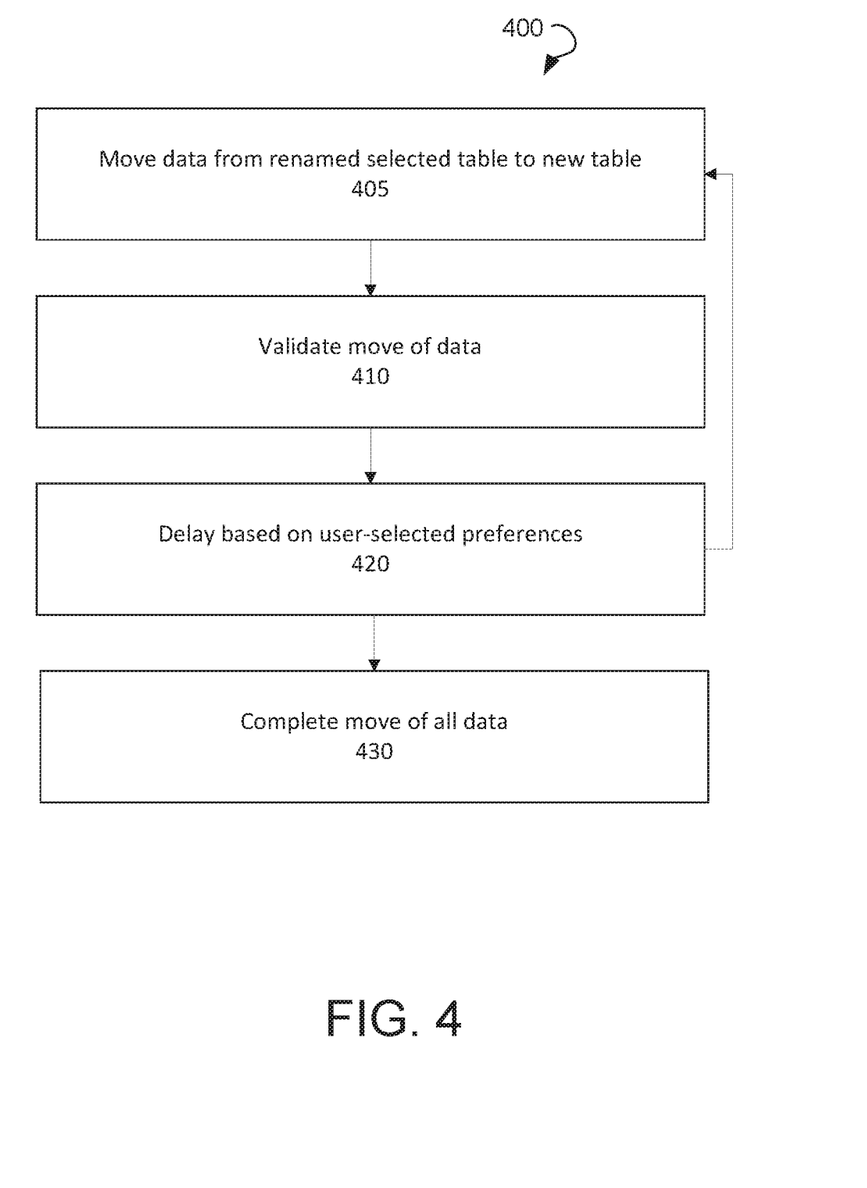
FIG. 4 shows a flow diagram of an exemplary method for moving data from a renamed selected table to a new table, in accordance with an embodiment.

FIG. 4 shows a flow diagram of an exemplary method 400 for moving data from a renamed selected table to a new table, further elaborating steps that may be executed as part of step 325. Since the table may include a very large data set, the transfer of all data from the renamed selected table may be executed in blocks, rather than all at once. At step 405, data may be moved from the renamed selected table to the new table. This may be done using, for example, a load data inpath command, that changes pointers to the data rather than performing a byte-by-byte copy of the data (as would be required if, as is conventionally required, the entire table were to be remade using a copy command). The move of data may be validated at step 410, by checking if data exists in the renamed selected table (e.g., the log_store_old table) and if the data (or data chunk) has been moved to the new table (e.g., the log_store_new table). Since a pointer change is being used, once data has been moved from the renamed selected table, it will not be contained within the renamed selected table after the move.

At step 420, a delay may be implemented based on user-selected preferences. The delay may be implemented using a sleep timer and may be staggered using any desired time period (e.g., bi-weekly, monthly, etc.) to avoid overburdening a metastore of the database system excessively. If data of the renamed selected table is moved in chunks, then steps 405, 410, and 420 are repeated as needed until all data has been moved at step 430. By moving data to the new table using only a change of pointers (rather than a byte-by-byte copy) command, the need to maintain separate tables for old and new data for the view is eliminated. Also, by using the view temporarily, while all data is moved into the new table, downtime is avoided to create the desired partition. The transfer of data may be implemented, in various embodiments, as a loop, starting with the oldest data in the table, and proceeding in chronological order.

Figure 5:
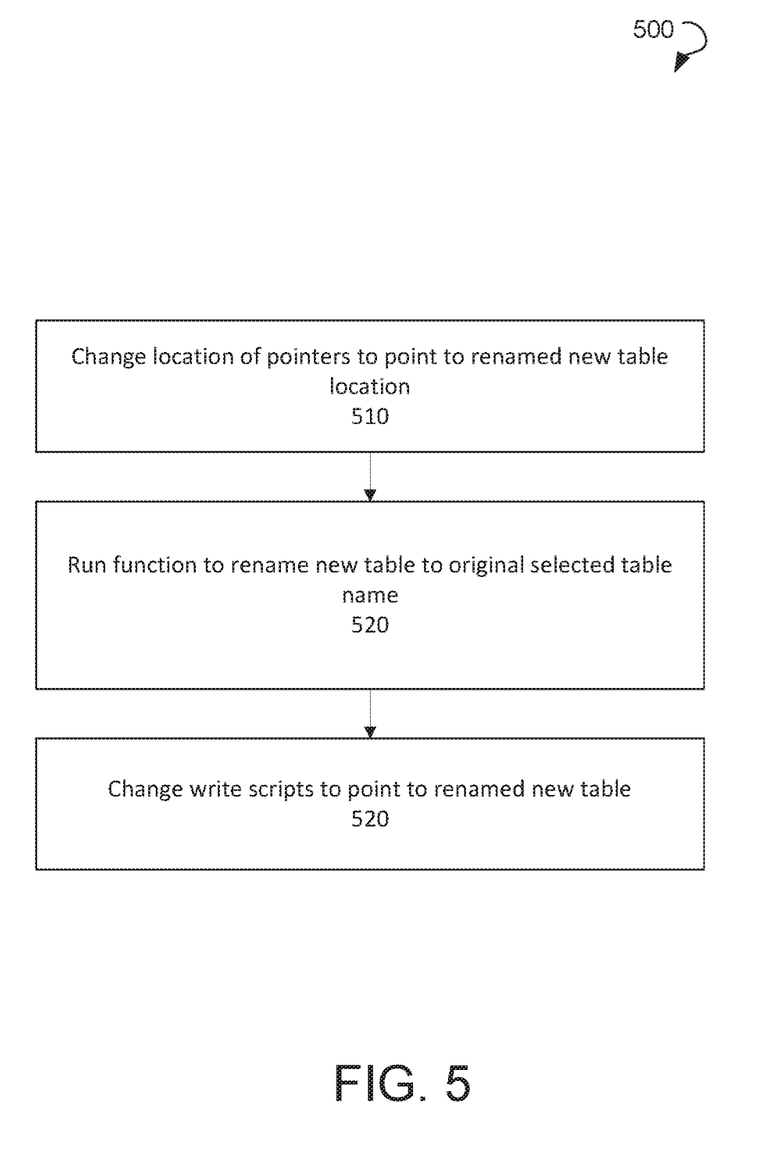
FIG. 5 shows a flow diagram of an exemplary method for renaming a new table that includes a new column and a new partition for the new column, in accordance with various embodiments of the present disclosure.

Returning to FIG. 3, in response to the transferring all data being completed, the new table may be renamed to an original name of the selected table at step 330 (e.g., the associated name of the first table). FIG. 5 shows a flow diagram of an exemplary method 500 for renaming a new table that includes a new column and a new partition for the new column, in accordance with various embodiments of the present invention. The renaming of the new table may be performed, for example, by changing the pointer of the distributed file system to refer to the renamed new table at step 510. Similar to step 315 discussed above, the new pointer may point to a location based on the renamed new table name, such as, for example: "/path/to/log_store/location/database_name.db/log_store" (matching the original name of the selected table). The renaming may be performed using an atomic operation at step 520 (i.e., an operation that may not be interrupted and appears to the database system to occur at once), which advantageously allows the renaming to be performed without requiring any down time for the database system. In an exemplary embodiment, the renaming may be executed using a "alter table . . . rename" command. The database system may then cause any data received after the renaming the new table to be included in the renamed new table, where subsequent queries of the selected table are directed to the renamed new table, by changing write scripts to point to the renamed new table at step 520. For example, file format commands of client applications, such as ORC scripts, may be changed as part of creating the view, to point to the renamed new table (instead of the new table under the new name, as was done in step 320 of method 300).

After method 300 is completed, the existing table is available having the requested new partition based on the new column. Several additional steps may be performed after the renaming the new table to have the original name of the selected table. For example, the database system may validate that the renamed new table has any requisite permissions related to accessing data within the renamed new table. When the requisite permissions are not included, a chmod command may be executed to change the access permissions of the renamed new table to match the originally selected table. The database system may also validate that the renamed new table has data quotas set to match data quotas of the selected table, to avoid any possible read or write errors caused by an inconsistency.

Figure 6:
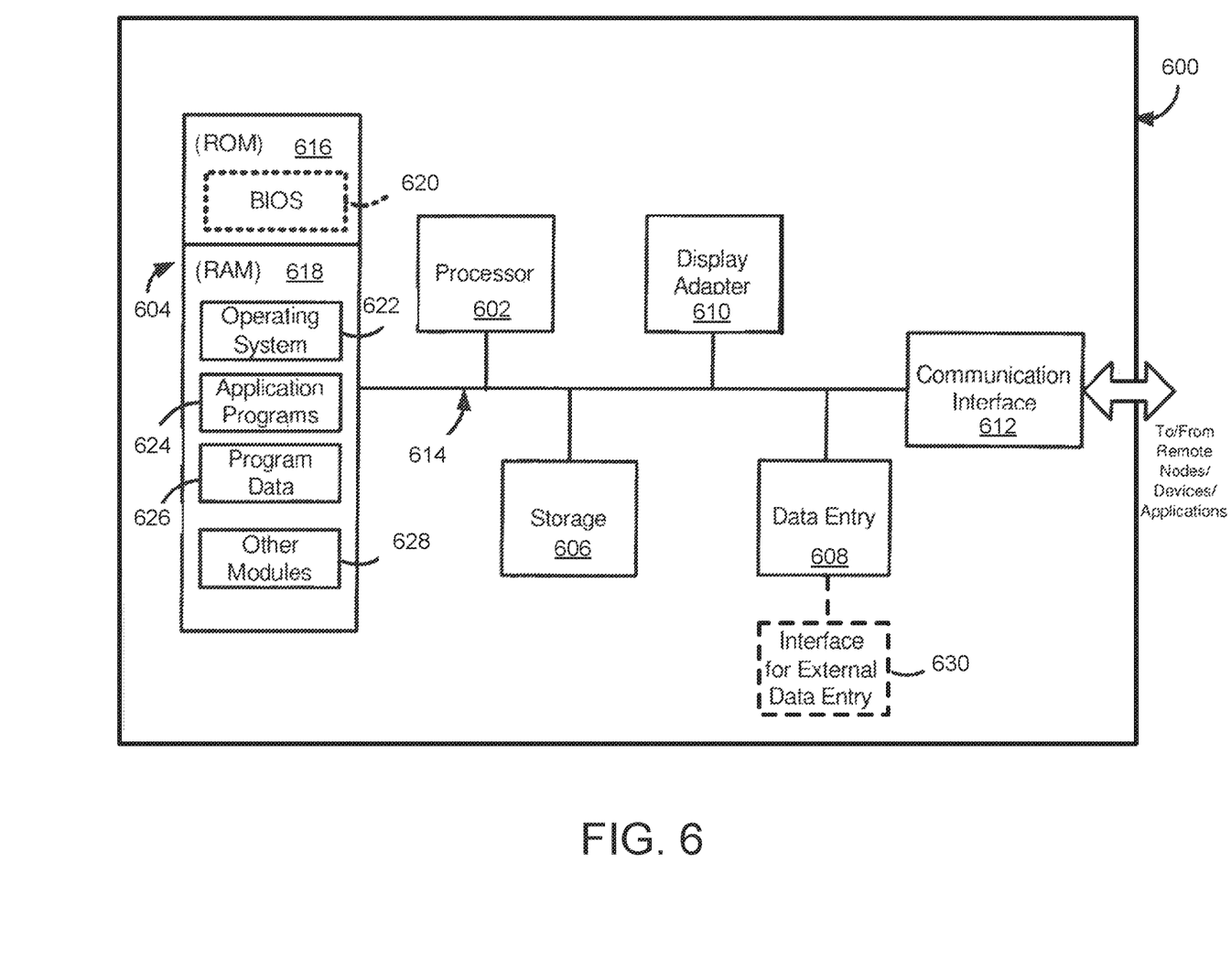
FIG. 6 is a block diagram of an exemplary system for registering a new column in an existing table on a distributed file system as a partition in accordance with various embodiments of the present disclosure.

FIG. 6 is a block diagram of an exemplary system for registering a new column in an existing table on a distributed file system as a partition in accordance with various embodiments of the present invention. With reference to FIG. 6, an exemplary system for implementing the subject matter disclosed herein, including the methods described above, includes a hardware device 600, including a processing unit 602, memory 604, storage 606, data entry module 608, display adapter 610, communication interface 612, and a bus 614 that couples elements 604-612 to the processing unit 602.

The bus 614 may comprise any type of bus architecture. Examples include a memory bus, a peripheral bus, a local bus, etc. The processing unit 602 is an instruction execution machine, apparatus, or device and may comprise a microprocessor, a digital signal processor, a graphics processing unit, an application specific integrated circuit (ASIC), a field programmable gate array (FPGA), etc. The processing unit

602 may be configured to execute program instructions stored in memory 604 and/or storage 606 and/or received via data entry module 608.

The memory 604 may include read only memory (ROM) 616 and random access memory (RAM) 618. Memory 604 may be configured to store program instructions and data during operation of device 600. In various embodiments, memory 604 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 604 may also include nonvolatile memory technologies such as nonvolatile flash RAM (NVRAM) or ROM. In some embodiments, it is contemplated that memory 604 may include a combination of technologies such as the foregoing, as well as other technologies not specifically mentioned. When the subject matter is implemented in a computer system, a basic input/output system (BIOS) 620, containing the basic routines that help to transfer information between elements within the computer system, such as during start-up, is stored in ROM 616.

The storage 606 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 600.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 606, ROM 616 or RAM 618, including an operating system 622, one or more applications programs 624, program data 626, and other program modules 628. A user may enter commands and information into the hardware device 600 through data entry module 608. Data entry module 608 may include mechanisms such as a keyboard, a touch screen, a pointing device, etc. Other external input devices (not shown) are connected to the hardware device 600 via external data entry interface 630. By way of example and not limitation, external input devices may include a microphone, joystick, game pad, satellite dish, scanner, or the like. In some embodiments, external input devices may include video or audio input devices such as a video camera, a still camera, etc. Data entry module 608 may be configured to receive input from one or more users of device 600 and to deliver such input to processing unit 602 and/or memory 604 via bus 614.

The hardware device 600 may operate in a networked environment using logical connections to one or more remote nodes (not shown) via communication interface 612. The remote node may be another computer, a server, a router, a peer device or other common network node, and typically includes many or all of the elements described above relative to the hardware device 600. The communication interface 612 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 612 may include logic configured to support direct memory access (DMA) transfers between memory 604 and other devices.

In a networked environment, program modules depicted relative to the hardware device 600, or portions thereof, may be stored in a remote storage device, such as, for example, on a server. It will be appreciated that other hardware and/or software to establish a communications link between the hardware device 600 and other devices may be used.

It should be understood that the arrangement of hardware device 600 illustrated in FIG. 6 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 600. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function). Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Figure 7:
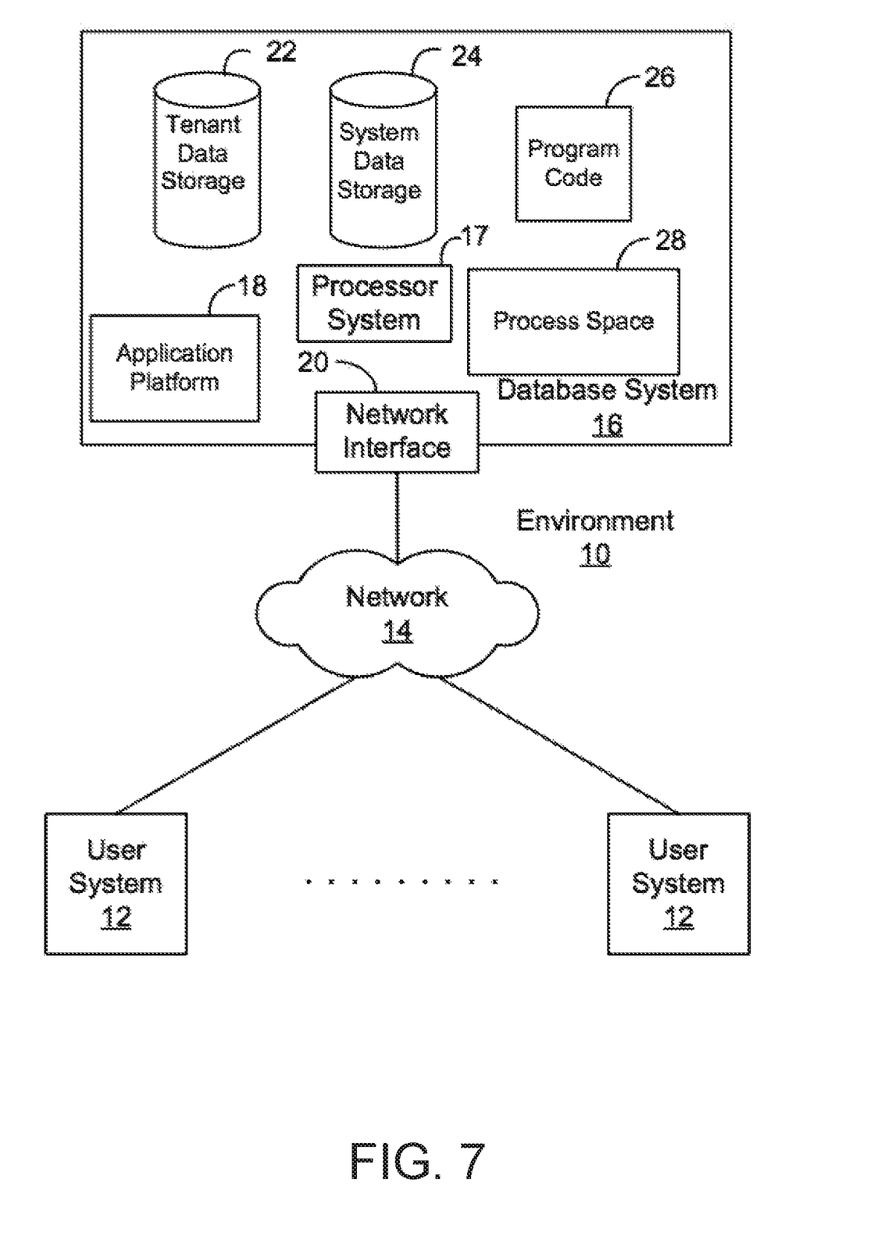
FIG. 7 is a block diagram of an example environment in which on-demand database services may be provided according to one or more implementations of the disclosure.

FIG. 7 shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 7 (and in more detail in FIG. 8) user systems 12 might interact via a network 14 with an on-demand database service, which is implemented in the example of FIG. 7 as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). A non-relational database management system (NRDBMS) or the equivalent may execute storage and fast retrieval of large sets of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third-party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 7, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 8:
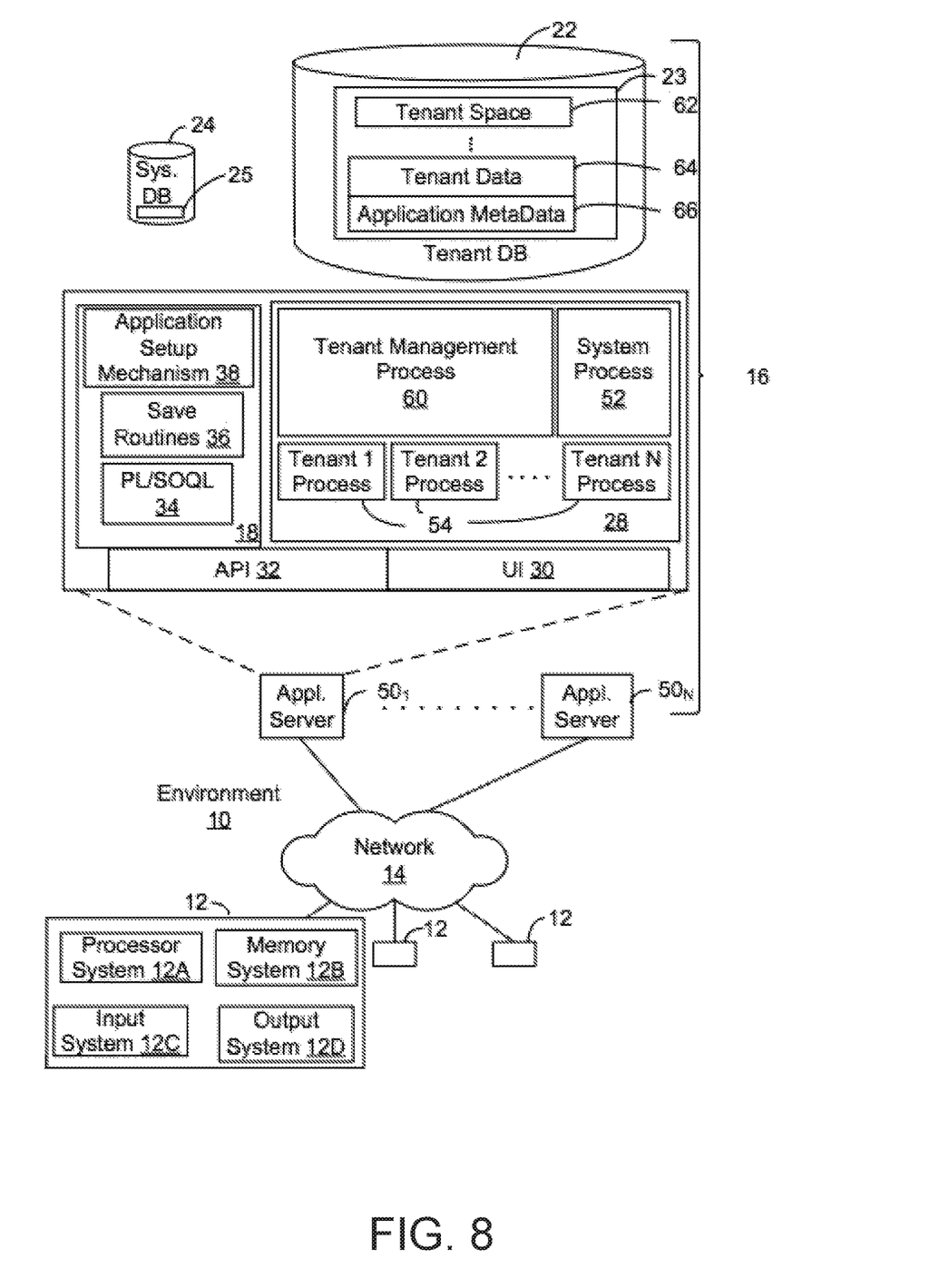
FIG. 8 is shows a block diagram of example elements of FIG. 1 and various possible interconnections between these elements according to one or more implementations of the disclosure.

One arrangement for elements of system 16 is shown in FIGS. 7 and 8, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 7 include conventional, well-known elements that are explained only briefly here. For example, each user system 12 could include a personal computer, server, smart phone, or any wireless access protocol (WAP) enabled device or any other computing device capable of interfacing directly or indirectly to the Internet or other network connection. The term "computing device" is also referred to herein simply as a "computer." User system 12 may run an HTTP client, e.g., a browsing program or "browser", or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such a smart watch or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser. Similarly, system 16 (and additional instances of an MTS, where more than one is present) and all of its components might be operator configurable using applications using processor system 17, which include one or more processors. Non-transitory computer-readable media as further described herein can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or any other type of computer-readable medium or device suitable for storing instructions and/or data. Additionally, the entire program code, or portions thereof, may be transmitted and downloaded from a source over a network connection. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 8 shows a block diagram of an example of some implementations of elements of FIG. 7 and various possible interconnections between these elements. That is, FIG. 2 also illustrates environment 10. However, in FIG. 8 elements of system 16 and various interconnections in some implementations are further illustrated. FIG. 8 shows that user system 12 may include processor system 12A, memory system 12B, input system 12C, and output system 12D. FIG. 2 shows network 14 and system 16. FIG. 8 also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers 501-50N, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8, system 16 may include a network interface 20 (of FIG. 1) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® or HBase databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server 501 might be coupled via the network 14 (e.g., the Internet), another application server 50N-1 might be coupled via a direct network link, and another application server 50N might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, HBase® and the like without departing from the scope of the implementations claimed.

Further, while one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:

receiving, by a database system, a request to add a new column to a first table stored within a distributed file system, the first table having an associated name;

creating, by the database system, in response to the request, a second table that includes all fields of the first table, the new column, and a new partition including data from the new column, the second table having an associated name;

causing, by the database system, any new data sent for the first table to be included in the second table;

causing, by the database system, in response to the request, the first table to be renamed, the renaming comprising changing a pointer of the distributed file system to refer to the renamed first table, the renaming being performed using an atomic operation;

creating, by the database system, a view pointing to data in each of the second table and the renamed first table, the view being a virtual table created on the distributed file system;

causing, by the database system, all data from the renamed first table to be transferred to the second table by adding pointers to the data to the second table;

routing, while the transferring all data is being performed, received queries to the renamed first table when data in the first table is being queried and routing the received queries to the second table when the new data is being queried; and causing, by the database system, the second table to be renamed to the name of the first table when the transfer of the data from the renamed first table to the second table is complete, the renaming comprising changing the pointer of the distributed file system to refer to the renamed second table, being performed using an atomic operation, and causing any data received after renaming the second table to be included in the renamed second table.

2. The method of claim 1, wherein the transferring all data from the renamed first table is performed using a "load data inpath" command.

3. The method of claim 1, wherein the transferring all data further comprises validating if unmoved data exists within the renamed first table and validating if all data has been moved to the second table.

4. The method of claim 1, wherein the transferring all data is performed without copying any data between tables.

5. The method of claim 1, wherein the renaming the first table and renaming the second table each further comprise changing write scripts from the original table to the renamed table.

6. The method of claim 1, further comprising validating whether the renamed second table has any requisite permissions related to accessing data within the renamed second table, and executing a chmod command when any requisite permissions are not included in the renamed second table.

7. The method of claim 1, further comprising validating whether the renamed second table has data quotas set to match data quotas of the first table.

8. A system comprising:
one or more processors; and
a non-transitory computer readable medium storing a plurality of instructions, which when executed, cause the one or more processors to:
receive a request to add a new column to a first table stored within a distributed file system, the first table having an associated name;
create in response to the request, a second table that includes all fields of the first table, the new column, and a new partition including data from the new column, the second table having an associated name;
cause any new data sent for the first table to be included in the second table;
cause in response to the request, the first table to be renamed, the renaming comprising changing a pointer of the distributed file system to refer to the renamed first table, the renaming being performed using an atomic operation;
create a view pointing to data in each of the second table and the renamed first table, the view being a virtual table created on the distributed file system;

cause all data from the renamed first table to be transferred to the second table by adding pointers to the data to the second table;
route, while the transferring all data is being performed, received queries to the renamed first table when data in the first table is being queried and routing the received queries to the second table when the new data is being queried; and
cause the second table to be renamed to the name of the first table when the transfer of the data from the renamed first table to the second table is complete, the renaming comprising changing the pointer of the distributed file system to refer to the renamed second table, being performed using an atomic operation, and causing any data received after renaming the second table to be included in the renamed second table.

9. The system of claim 8, wherein the transfer all data from the renamed first table is performed using a "load data inpath" command.

10. The system of claim 8, wherein the transfer all data further comprises validating if unmoved data exists within the renamed first table and validating if all data has been moved to the second table.

11. The system of claim 8, wherein the transfer all data is performed without copying any data between tables.

12. The system of claim 8, wherein the renaming the first table and renaming the second table each further comprise changing write scripts from the original table to the renamed table.

13. The system of claim 8, wherein the plurality of instructions, when executed, further cause the one or more processors to validate whether the renamed second table has any requisite permissions related to accessing data within the renamed second table, and execute a chmod command when any requisite permissions are not included in the renamed second table.

14. A computer program product comprising computer-readable program code to be executed by one or more processors when retrieved from a non-transitory computer-readable medium, the program code including instructions to:
receive a request to add a new column to a first table stored within a distributed file system, the first table having an associated name;
create in response to the request, a second table that includes all fields of the first table, the new column, and a new partition including data from the new column, the second table having an associated name;
cause any new data sent for the first table to be included in the second table;
cause in response to the request, the first table to be renamed, the renaming comprising changing a pointer of the distributed file system to refer to the renamed first table, the renaming being performed using an atomic operation;
create a view pointing to data in each of the second table and the renamed first table, the view being a virtual table created on the distributed file system;
cause all data from the renamed first table to be transferred to the second table by adding pointers to the data to the second table;
route, while the transferring all data is being performed, received queries to the renamed first table when data in the first table is being queried and routing the received queries to the second table when the new data is being queried; and cause the second table to be renamed to the name of the first table when the transfer of the data from the renamed first table to the second table is complete, the renaming comprising changing the pointer of the distributed file system to refer to the renamed second table, being performed using an atomic operation, and causing any data received after renaming the second table to be included in the renamed second table.

15. The computer program product of claim 14, wherein the transfer all data from the renamed first table is performed using a "load data inpath" command.

16. The computer program product of claim 14, wherein the transfer all data further comprises validating if unmoved data exists within the renamed first table and validating if all data has been moved to the second table.

17. The computer program product of claim 14, wherein the transfer all data is performed without copying any data between tables.

18. The computer program product of claim 14, wherein the renaming the selected table and renaming the new table each further comprise changing write scripts from the original table to the renamed table.

19. The computer program product of claim 14, wherein the program code includes further instructions to validate whether the renamed second table has any requisite permissions related to accessing data within the renamed second table, and execute a chmod command when any requisite permissions are not included in the renamed second table.

20. The computer program product of claim 14, f wherein the program code includes further instructions to validate whether the renamed second table has data quotas set to match data quotas of the first table.

\* \* \* \* \*